United States Patent [19]
Moran, Jr.

[11] Patent Number: 5,316,165
[45] Date of Patent: May 31, 1994

[54] FOLDABLE ELECTRICAL COMPONENT ENCLOSURES

[75] Inventor: Thomas F. Moran, Jr., Chagrin Falls, Ohio

[73] Assignee: Qube Corporation, Chagrin Falls, Ohio

[21] Appl. No.: 7,567

[22] Filed: Jan. 22, 1993

Related U.S. Application Data

[63] Continuation-in-part of Ser. No. 683,783, Apr. 11, 1991, abandoned.

[51] Int. Cl.⁵ ............................................. B65D 7/00
[52] U.S. Cl. ...................................... 220/62; 220/3.2; 220/416; 220/6
[58] Field of Search ...................... 220/3.2, 6, 416, 62

[56] References Cited

U.S. PATENT DOCUMENTS

| | | | |
|---|---|---|---|
| 1,833,469 | 11/1931 | Myers . | |
| 1,873,720 | 8/1932 | Piker | 220/62 |
| 2,732,090 | 1/1956 | Karlin | 220/3.2 |
| 2,850,202 | 9/1958 | Schneider et al. | 220/3.2 X |
| 3,145,904 | 8/1964 | Bromley | 220/62 |
| 3,207,357 | 9/1965 | Schmitt | 220/62 |
| 4,010,865 | 3/1977 | Wilgus . | |
| 4,202,457 | 5/1980 | Tansi | 220/62 X |
| 4,235,346 | 11/1980 | Liggett . | |
| 4,438,859 | 3/1984 | Solek | 220/3.2 |
| 4,953,735 | 9/1990 | Tisbo et al. | 220/62 X |

OTHER PUBLICATIONS

Herco, Inc. "Carbide Tipped V-Grooving and Cutting Tools" (Catalog HVG/2).
Herco, Inc. "Custom Carbide Tipped Cutting Tools" (Catalog HCT/1).

Primary Examiner—Steven M. Pollard
Attorney, Agent, or Firm—Pearne, Gordon, McCoy & Granger

[57] ABSTRACT

A rigid plastic enclosure made from flat blanks which is particularly well suited for use as an electrical or electronic component enclosure. The top, bottom, back, and side walls of the enclosure are parts of a unitary structure made by cutting and/or routing a single sheet of plastic which can be folded and locked into an open-faced, box-shaped structure. A cover or face plate can be fastened to the folded and locked structure to complete the enclosure. Because the enclosure is constructed from plastic, holes can be easily drilled into its walls, eliminating the need for providing knockout holes at predetermined locations. The invention is lighter than steel enclosures, and can be shipped and stored in a flat configuration, thereby saving space and allowing for lower shipping and handling costs.

13 Claims, 8 Drawing Sheets

FOLDABLE ELECTRICAL COMPONENT ENCLOSURES

CROSS-REFERENCE TO RELATED APPLICATION

This application is a continuation-in-part of U.S. patent application Ser. No. 07/683,783 filed Apr. 11, 1991, entitled "FOLDABLE ELECTRICAL COMPONENT ENCLOSURE", now abandoned.

BACKGROUND OF THE INVENTION

The present invention relates to plastic enclosures which can be stored and shipped as flat sheets but are capable of being folded up along flexible fold lines and locked together to make rigid boxlike structures, and, more particularly, to such enclosures which are suitable for use as wall-mounted electrical component enclosures, such as pull boxes, junction boxes, splice boxes, and equipment cabinets.

DESCRIPTION OF RELATED ART

Electrical component enclosures, such as junction boxes, are commonly made from sheet metal. Because fabrication of sheet metal enclosures would be difficult and time-consuming if done in site by an end user, they are usually shipped preassembled, which means that shipping and storage space must be wasted on the empty volume within the enclosure.

During both the initial installation of electrical components within the enclosure and during subsequent repair of these components, an electrician's access to the electrical components is generally limited to a single open panel at the front face or at one wall of the enclosure. This restricted access often makes it awkward and difficult to work on the electrical components in the enclosure, which results in more time being expended on installation or repair than would otherwise be required if the sidewalls were not in the way.

Because it is relatively difficult to cut or drill holes into metal, an electrician is generally not completely free to run cable or conduit into a sheet metal enclosure at whichever location he desires, but, to the contrary, he is generally limited to standard size knockout holes which are provided at predetermined locations in the sidewalls of the enclosure. A further disadvantage of sheet metal enclosures is that larger enclosures can be difficult to mount on a wall because of their weight.

Known molded plastic electrical component enclosures and customized plastic enclosures which are solventcemented or glued together or heat-welded by hand are lighter, and can be cut or drilled more easily than metal enclosures, but they still have the remaining disadvantages of wasted shipping and storage space, limited access to components contained therein, and are relatively expensive.

Various methods of imparting fold lines to hard plastic materials are known. U.S. Pat. Nos. 3,292,513; 3,334,802; 3,350,492; 3,594,464; 3,768,950 4,373,929; 4,386,926; and 4,664,648; all disclose various techniques for cold-scoring plastic sheeting by means of mechanical deformation to create fold lines. Techniques for creating fold lines which involve a combination of heating to soften the plastic and mechanical deformation are disclosed in U.S. Pat. Nos. 3,379,814; 2,589,022; 3,907,193; 4,179,252; 4,642,086; and 4,946,430. U.S. Pat. No. 3,132,649 and 3,201,145 teach plastic molding techniques for imparting fold lines. These patents are generally directed to methods of providing fold lines in plastic sheeting used for packaging consumer goods, wherein the plastic sheeting is capable of being handled by high speed folding and filling machines. Foldable plastic containers produced by known techniques are generally not susceptible to reuse without substantial loss in utility, nor are they generally capable of being easily assembled without specially designed machinery and adhesive agents, nor do they have sufficient mechanical strength for construction-related applications.

SUMMARY OF THE INVENTION

The invention provides durable plastic enclosures which can be shipped and stored flat to save space and which can be folded up along flexible fold lines and provided with covers to make boxlike enclosures, the sidewalls of which can be partially unfolded so that they are in substantially the same plane as the backplate to permit easy access to any components within the enclosure. The invention is particularly useful as an electrical or electronic component enclosure, and is suitable for both high voltage and low voltage applications.

The enclosure is made from plastic sheeting, and preferably from a plastic having high impact strength, with polyvinyl chloride being generally preferred. The plastic sheeting is cut and grooved to form a blank with fold lines so that it can be folded into an open-faced, box-shaped structure. The foldable plastic blank has a backplate, four sidewalls with an edge of each sidewall attached to an edge of the backplate via an integral fold line or hinge, and flanges with an edge of each flange attached via an integral fold line to an edge of a sidewall which is opposite to the edge of the sidewall attached to the backplate. The sidewalls and flanges are foldable along the fold lines to form a six-sided structure. At each end of each flange is a projection or a slot which respectively engages an interlocking slot or projection on the end of an adjacent flange when in the folded position. The enclosure is completed, after the walls and flanges are folded and the interlocking means at the ends of the flanges have been engaged, by affixing a plastic faceplate to the flanges or otherwise closing the open or accessible face with a faceplate.

The fold lines between the sidewalls and the backplate, and between the flanges and the sidewalls, are created by cutting or sawing grooves into the plastic sheet to provide a narrow strip of reduced thickness at the bottom of the groove which can be easily bent to serve as a hinge. The grooves are predominately V-shaped with an included angle of substantially 90 degrees, with one wall of the groove having a steplike linear ridge and the opposing wall having a steplike linear furrow so that when a sidewall is bent 90 degrees relative to the backplate, the steplike ridge fits into the steplike furrow to provide four contact surfaces at each folded hinge, thereby enhancing the structural stability of the enclosure.

The two unattached edges of each sidewall are beveled to provide a fitted non-overlapping corner when the sidewalls are folded to the assembled position. At each edge of the assembled enclosure where one sidewall intersects with another, one beveled edge is preferably provided with a steplike ridge as described above and the other abutting beveled edge is provided with a steplike furrow. These ridge and furrow features of the beveled edges of the sidewalls are structurally identical to the ridge and furrow features of the "V" grooves.

The present invention provides an economical alternative to enclosures currently used by electricians for housing electrical equipment. Because the enclosure is made from a low conductivity or non-conductive plastic material, there is a reduced risk of electrical shock with the invention as compared to standard sheet metal enclosures. Additionally, the invention is lighter, easier to install, easier to work with, and requires less space for storage and shipment than electrical enclosures which were previously used.

In accordance with another aspect of the invention, protection against electromagnetic interference and static electricity buildup is provided by incorporating a static-dissipative additive directly into the polymeric blend from which the plastic sheeting is made or a static-dissipative layer in the plastic sheet. Goods such as printed circuit boards, which require protection against electromagnetic interference and electrostatic buildup, are shipped in enclosures made from such plastic sheets. At the termination point of the shipment, the goods are removed from the enclosure, the enclosure is disassembled and folded flat and then shipped back to the starting point for reuse.

BRIEF DESCRIPTION OF THE DRAWINGS

Further features and advantages of the present invention will become apparent upon consideration of the detailed description of the presently preferred embodiment when taken in conjunction with the accompanying drawings.

FIG. 19 is a top plan View of a foldable plastic blank for making an enclosure for shipping printed circuit boards or the like.

DETAILED DESCRIPTION OF THE INVENTION

Figure 3:
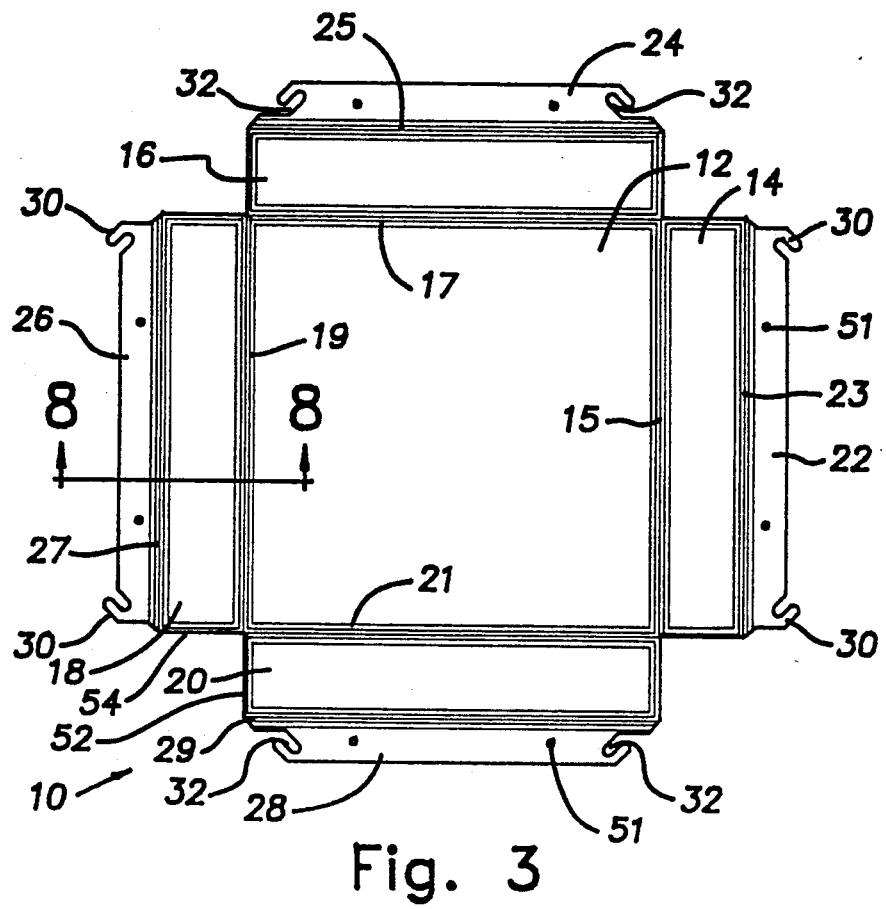
FIG. 3 is a top plan view of the blank of FIG. 2 after the corner portions have been cut out and holes drilled.

An extruded or calendared sheet of rigid plastic 5 is cut and/or routed to produce a flat, unitary, foldable blank 10, as shown in FIG. 3. This is done on a computer-numeric-controlled router machine, such as shown and described in U.S. Pat. No. 4,723,766. By inputting different data into the computer and programming the machine, foldable blanks of different sizes can be automatically produced, all on the same machine. Custom sizes can be easily made by slight changes in the programming.

Figure 1:
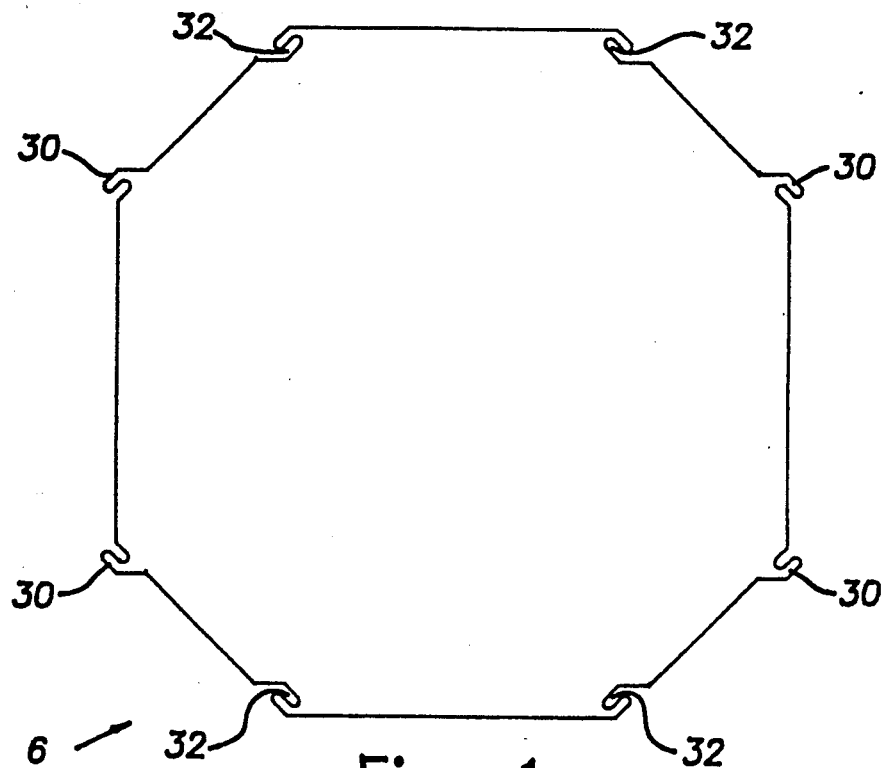
FIG. 1 is a top plan view of the plastic blank after the perimeter cut.
Figure 5:
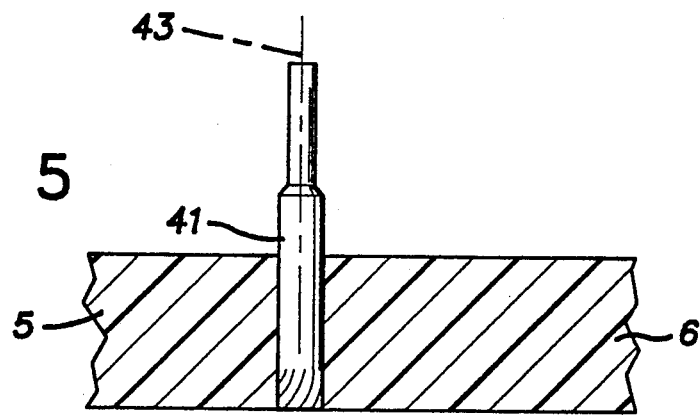
FIG. 5 is an enlarged, fragmentary, cross-sectional view of the perimeter router for cutting out the blank of FIG. 1.
Figure 6:
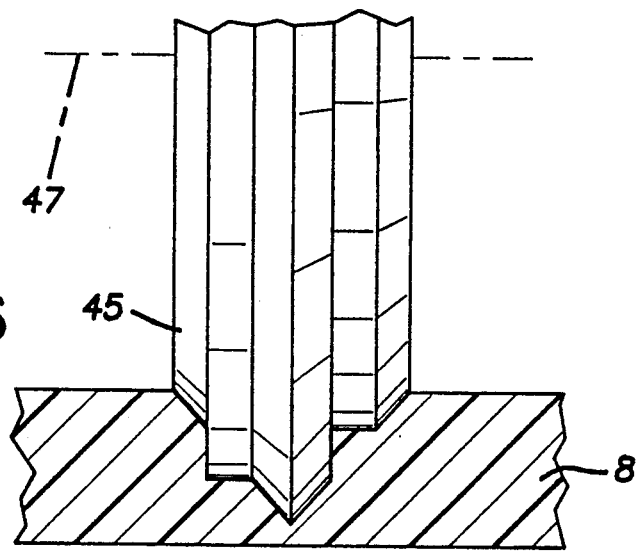
FIG. 6 is an enlarged, fragmentary, cross-sectional view of the circular saw blade used to cut out the parallel "V" grooves in the blank of FIG. 2.
Figure 7:
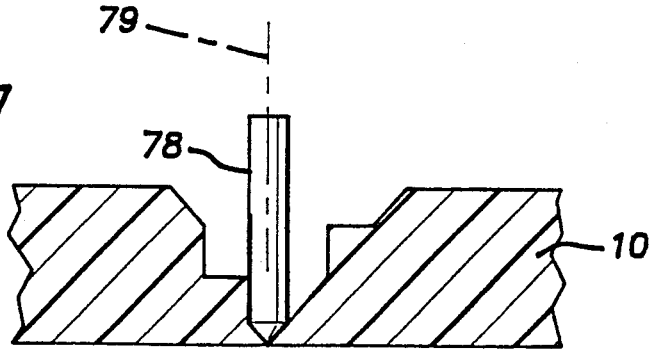
FIG. 7 is an enlarged, fragmentary, cross-sectional view of the router used to cut the corner portions off from the blank of FIG. 2.

Manufacture of the blank 10 is done in at least three steps, with at least three different tools. A blank 6 (FIG. 1) is first cut out of a sheet of plastic 5 with a perimeter router 41 as shown in FIG. 5. The perimeter router 41 rotates about a vertical axis 43. The router 41 cuts all of the way through the plastic sheet 5 and cuts out a shape which is substantially octagonal as shown in FIG. 1. The corner portions 49 may be cut out at this step or in subsequent steps. Grooves 15, 17, 19, 21, 23, 25, 27, and 29 are then cut into the blank With one or more saw blades 45, as shown in FIG. 6. The saw blade 45 rotates about a horizontal axis 47. The saw blade is made up of a number of separate teeth with the Cross section shown in FIG. 6. Blank 8 (FIG. 2) results from this saw operation. Then, if the corner portions 49 were not initially cut out in the first steps, a corner cutter (FIG. 7) cuts through the remaining thickness of the corner portions 49 from the blank 8 at the bottom center of the grooves to make the foldable cross-shaped blank 10 of FIG. 3. Finally, holes (FIG. 3) are drilled in the blank as desired. The computer numeric-controlled cutting machine (CNC machine) and noted tools are all well known in the art and have been for many years. Each separate tool is mounted on a separate head. The heads move up and down on a Z axis and horizontally on a Y axis, and the bed holding the plastic sheet moves horizontally on an X axis in two directions. The plastic sheet or blank is held in position on the bed by vacuum.

Figure 11:
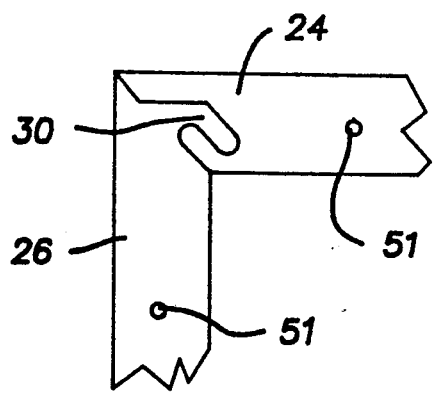
FIG. 11 is a fragmentary top view of the flanged frame of a folded enclosure, showing the interlocking projection and slot as assembled.

The cross-shaped foldable blank 10 has a rectangular backplate 12 and four rectangular sidewalls 14, 16, 18, and 20 extending from each side of the backplate. Each side wall has a length equal to that of the side of the backplate 12 to which it adjoins. All four sidewalls have the same width, which is equal to the desired depth of an assembled enclosure. Extending from each sidewall along the side opposite from the backplate 12 are flanges 22, 24, 26, and 28. Each flange has a generally isosceles trapezoidal shape with a base equal in length to that of the adjoining sidewall and with acute side angles of 45 degrees. Flanges 22 and 26, which extend from opposite sidewalls 14 and 18, have footlike projections 30 extending from each of its non-parallel sides. The remaining flanges 24 and 28 have matching footlike slots 32 cut into their non-parallel sides. The slots 32 are sized and shaped to snugly receive the matching projections 30, as shown in FIG. 11, thus providing resilient mechanical interlocking means for closing and stabilizing the assembled enclosure. Except for the interlocking means, the portions of the edges of the flanges which do come together do so at a 45-degree angle. The projections and/or the slots, and, in fact, most or all of the exposed edges, may be at least partially beveled or rounded for safety and to permit easier interlocking and assembly and disassembly.

Obviously, other mechanical interlocking means may be used in place of the slot and projection arrangement shown, such as sawtooth-shaped and keystone-shaped projections and correspondingly shaped openings. The mechanical interlocking means is preferably integral with and hinged to the top edges of the sidewalls opposite from the sidewall hinges to the backplate. While a continuous flange as shown is believed to be preferable, tabs integrally hinged to the edges of the sidewalls may be employed, or the interlocking means may be integrally hinged to the edges of the sidewalls, as will hereinafter be shown and described.

Any means which holds the edges of the flanges together so that a rigid enclosure structure is formed achieves the purposes of this invention. For example, the edges of the flanges can be cemented together with glue or the inside edges of the sidewalls can be Welded together with plastic welding material.

Figure 8:
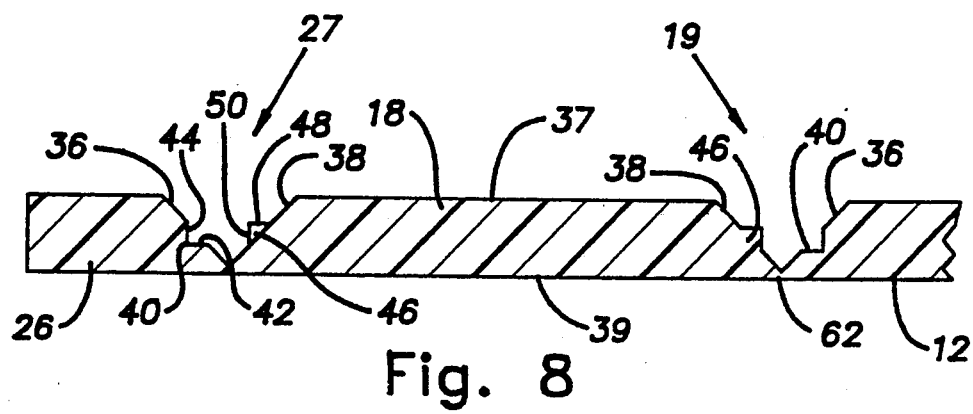
FIG. 8 is an enlarged, fragmentary, cross-sectional view of the foldable plastic blank taken along line 8—8 in FIG. 3.
Figure 9:
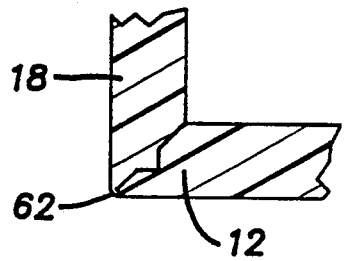
FIG. 9 is an enlarged, fragmentary, cross-sectional view of the foldable plastic blank of FIG. 3, showing a flexible hinge in the folded-up position.

Along the boundaries between the backplate and the four sidewalls, and between the sidewalls and each of the flanges, are a first set of parallel grooves 17 and 25 and 21 and 29, and a second set of parallel grooves 19 and 27 and 15 and 23 which are perpendicular to the first set of grooves. Each groove has a cross section as shown in FIG. 8, and is predominantly V-shaped with inside walls or faces 36 and 38 which slope downwardly from the top surface 37 of the plastic blank 10 at a 45-degree angle to the bottom surface 39 to form a 90-degree included angle between the groove walls. One inside wall 38 of each groove has a smaller 90-degree L-shaped furrow or groove 40 having two inside faces 42 and 44 which are, respectively, parallel and perpendicular to the plane of the plastic blank. The other inside wall 36 of each furrow has a steplike ridge or rib or tongue 46 with faces 48 and 50 which are also respectively parallel and perpendicular to the plane of the plastic blank. As shown in FIG. 9, these ridges and furrows are complementary and interfit to provide multiple contact surfaces in the folded position which improve the structural stability of the enclosure. Multiple furrows and conforming ridges and differently shaped furrows and ridges or interfitting tongue-and-groove formations are possible to provide the same structural stability or enhance it. These furrow and ridge features cause the abutting sidewalls with beveled edges to interlock when folded into a box shape, preventing the possibility of adjoining beveled edges from movement. The ridges and furrows also provide for an interference fit for solvent welding where permanence is required. Furthermore, the furrows may contain O-rings or other sealant material. In cross section, the ridge or male portion may have an enlarged head so that it has to be forced or popped into the furrow or female portion.

The included angle for the grooves should be 90 degrees so that when the sidewalls are folded up, they make a 90-degree angle with the backplate or are perpendicular to it and fit together for rigidity and support. The angle has to be cut out of the plastic sheet with a saw blade or otherwise formed in order to achieve the desired tolerances, which should be within 1 or 2 degrees at the most.

Figure 2:
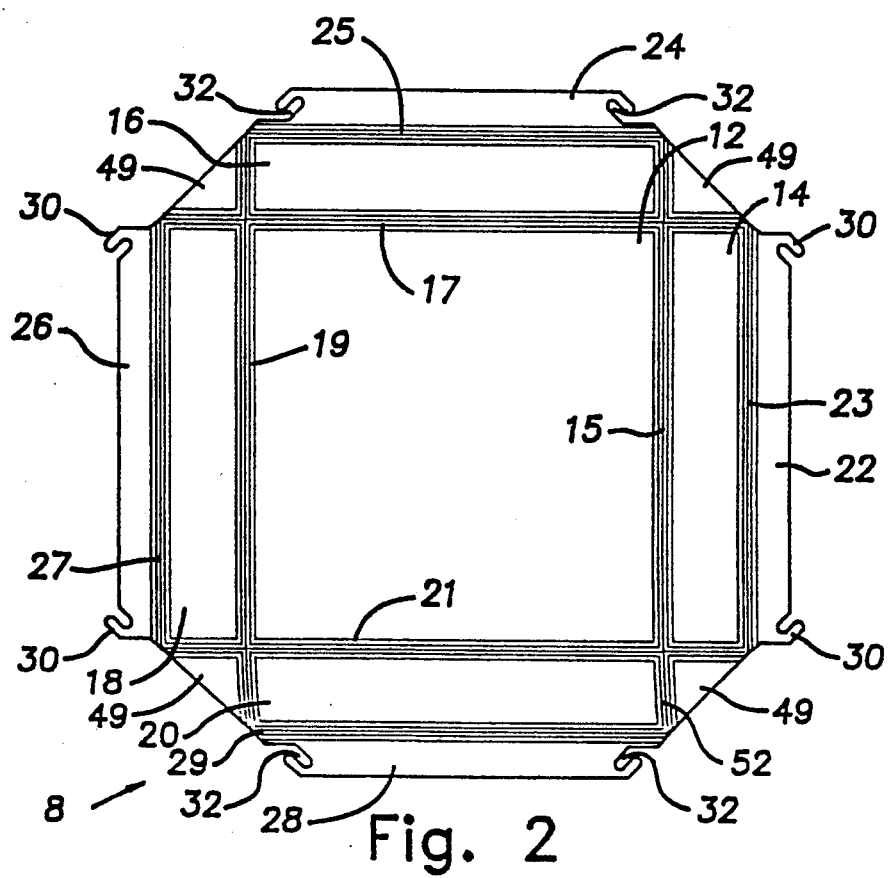
FIG. 2 is a top plan view of the blank of FIG. 2 after the parallel "V" grooves for the fold lines have been cut out.

The saw blade 45 which cuts the "V" grooves continues to cut across the sides of the blank to leave corner portions 49 as shown in FIG. 2. When the corner portions 49 are removed or cut out, in effect, one-half of the groove is removed so that the edge of one sidewall when folded up can interfit with the edge of the other sidewall. Thus, the steplike ridge 46 of groove 19 is on the sidewall 18 (FIG. 9). The steplike ridge 46 of groove 15 is on the sidewall 14. For grooves 17 and 21, the steplike ridge 46 is on the backplate 12. On backplate 12, grooves 15 and 19 have furrows 40 and grooves 17 and 21 have ridges 46. Thus, one set of parallel grooves on the backplate has ridges and the other set has furrows and the cross-sections of the sets at right angles to each other are reversed so that when the adjoining sidewall edges 18 and 20 are abutted as in FIG. 10, they interfit and are water resistant.

The preferable ridge and furrow design has a 90% included angle as shown and is centered on the faces of the grooves. The ridges and grooves preferably have planar surfaces because they are easier to cut or machine out as compared to rounded non-planar surfaces.

Figure 10:
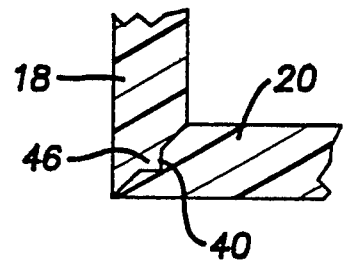
FIG. 10 is an enlarged, fragmentary, cross-sectional view, showing a corner with adjoining sidewall edges in the assembled condition.

As shown in FIG. 10, the sidewall edges 52 and 54 (FIG. 3) are beveled at a 45-degree angle and come together to make a 90-degree angle corner. In order for the edges of the sidewalls to interfit as shown in FIG. 10, the grooves have to be cut out of the blank in the reversed manner described above and the corner portions have to be removed so as to provide interfitting, complementary sidewall edge surfaces.

One saw blade should be used to cut grooves 15, 17, 19 and 21 in order to make them identical. If different blades are used, they may be sharpened differently and the edges of the sidewalls may not interfit as accurately as desired and they may not be water resistant. When a single saw is used to cut the grooves, it should be rotated 90 or 270 degree turns about its vertical axis in order to have the grooves at right angles to each other reversed in cross-section or mirror image counterparts. Alternatively, the work table can be turned 90 or 270 degrees for successive grooves. In FIG. 8, groove 19 is reversed in cross-section to groove 27 but otherwise identical.

It is contemplated that the included angle of the grooves can be greater or less than 90 degrees in order to provide other than right-angle structures.

When adjacent sidewalls are bent upward 90 degrees, the beveled edges come together and engage one another, with the ridge 46 of one edge interfitting with furrow 40 of the other edge to provide a type of tongue-and-groove configuration which resists slippage and provides additional structural stability to the assembled enclosure. The multiple contact surfaces also provide a water-resistant barrier. Water resistance and structural stability can be further enhanced by providing multiple grooves and conforming ridges at beveled edges to increase the number of contacting surfaces at each corner formed by intersecting sidewalls.

The corner joints of the sidewalls must be sufficiently water-resistant so as to prevent water infiltration when the enclosure is sprayed with a hose. Electrical component enclosures have to meet National Electrical Manufacturers Association (NEMA) specifications 1, 3, 3R, 3S, 4, 4X, 12, and 13, and Underwriters Laboratories specifications UL 50, 508, and 764C. It has been found that the edges between sidewalls of enclosures of the present invention can resist both water sprayed from a hose and water under mild pressure. An enclosure of the present invention was tested by folding it up without the use of gaskets or seals, and filling it with water. It did not leak.

As the size of the enclosure increases and the relative thickness of the plastic sheet material decreases, the enclosure may lose some of its raintight integrity. In such cases, the edges may be solvent-welded or plastic-welded together.

Because the hinge 62 covers the joints between the sidewalls and the backplate (FIG. 9), water cannot infiltrate. For water tightness, the important joint is thus at the corners of the sidewalls, as shown in FIG. 10. If that joint is simply two flat surfaces at 45-degree angles to each other, there is water infiltration.

The foldable flat blank 10 has two intersecting grooves 19 and 21 (FIG. 3) with two longitudinal axes. Upon folding up the sides 18 and 20 perpendicular to each other and perpendicular to the backplate 12, there are three intersecting longitudinal axes which form a corner or an inverted pyramid. Each groove has eight planar surfaces. When the blank is folded up, there are thus a total of twenty four planar surfaces which have to interfit at the corner.

Figure 13:
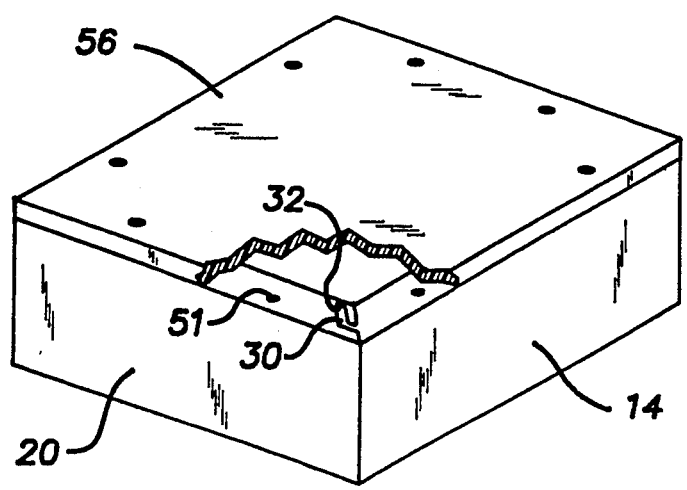
FIG. 13 is a perspective view with portions removed of the blank of FIG. 8 folded up and assembled with a cover to make a rigid, raintight structure.

Upon assembly, the foldable blank 10 (FIG. 3) forms five sides of an open-faced, box-shaped structure, with the open side having a flanged rim. This is shown in FIG. 13. The box is easily assembled by folding two opposite sidewalls 16 and 20 upward into a vertical position relative to the backplate. While maintaining the two sidewalls in this vertical position, flanges 24 and 28 are folded 90 degrees toward the inside of the enclosure. Adjacent sidewalls 14 and 18 are then folded upward into a vertical position relative to the backplate. The furrows and ridges on sidewalls 14 and 18 then interlock with the furrows and ridges in sidewalls 16 and 20. The footlike projections 30 on sidewalls 14 and 18 are then interlocked into the adjacent footlike slots 32 on sidewalls 16 and 20. This is accomplished with a natural motion as the flanges 22 and 26 are folded into place.

As shown in FIG. 13, the interlocking means comprising the footlike projection 30 which fit into the footlike slots 32 lie in a plane parallel to the backplate, as do the flanges. The advantage of this arrangement is that when the enclosure is assembled, the cover 56 covers or protects the interlocking means so that water cannot enter at the joints of the interlocking means.

A cover or faceplate 56 (FIG. 4) is provided to complete the enclosure. The cover or faceplate 56 is made by cutting a sheet of plastic into a rectangular shape having dimensions substantially identical to the backplate and drilling screw holes 58 to match the holes in the flanges. The flanges are also provided with pre-drilled screw holes 51 which can be brought into alignment with the holes 58 in the faceplate for attaching the faceplate to the assembled foldable structure via fasteners (not shown). It has been found that ¼-inch screws with 20 threads/inch are generally suitable for use with the invention, and that screw holes having a diameter of 0.170 inch are appropriate for accommodating these ¼-inch screws. Alternatively, the screw holes may be drilled to a diameter of about 0.333 inch to receive a female threaded plastic insert for receiving ¼-inch screws. The back of the faceplate and/or the top of the flanges may be provided with a gasket, seal, or similar means to effect a seal therebetween. The holes 58 and 51 may be drilled to a diameter of about 0.281 to receive a self-contained plastic speed fastener as is used in automotive applications.

In the preferred embodiment, the plastic blank has a ¼-inch nominal thickness which corresponds to an actual thickness of about 0.239 inch. The distance from the point at which the faces of the V-shaped groove intersect to the bottom face 39 of the plastic sheet along a line perpendicular to the plane of the plastic sheet is typically between 0.03 and 0.06 inch. This reduced thickness below the groove can provide a flexible hinge 62 (FIG. 8) which allows the sidewalls to be easily bent 90 degrees upwardly into the groove and for the flanges to be bent 90 degrees relative to the sidewall. The hinges or hinge portions 62 thus become the fold lines for the plastic blank. The thickness of the hinge 62 varies with the flexibility of the plastic of the blank from which the groove is cut. As can be seen in FIG. 8, the hinge 62 is much thinner than the plastic blank. The grooves 27 and 19 are cut out of the top surface 37 of the plastic blank to a depth which is close to the bottom surface 39, leaving the thin hinge 62 to function as the fold line. The plastic sheet has to be thick enough (usually not less than 0.125 inch) to permit the formation of "V" grooves with ridges 46 which can interfit with furrows 40 as noted.

With some materials and in some situations, the hinge 62 may have to be heated before it is bent. The plastic may not be flexible enough to permit the hinge to be bent without the application of heat.

Almost any rigid or semirigid plastic material may be used in the production of the described enclosures. Materials used for constructing the invention should be non-corrosive and should have a very low electrical conductivity. Preferred materials include solid or foamed polyvinyl chloride, polyethylene, low density or high density polypropylene, acrylics, and polycarbonate. Polyvinyl chloride (PVC) materials suitable for use with the invention should have some plasticizer in them in order to provide a flexible or living hinge. If a rigid PVC is used, without plasticizer, the hinge portions will have to be heated before being bent. The polyether and polypropylene plastic materials do not require a plasticizer. PVC materials include the following: VYNTEC, which is a PVC sheet manufactured by Vycom, of Scranton, Pa., and sold by Commercial Plastics and Supply Company, Cleveland, Ohio, and by Curbell Industrial Plastics Company, Cleveland, Ohio. PVC sheet plastics are also available from B.F. Goodrich Company, Cleveland, Ohio. Other suitable materials are TROVICEL, a foamed PVC manufactured by Huls America Inc., Piscataway, N.J. and sold by Commercial Plastics and Curbell; and SINTRA, another foamed PVC which is manufactured by Alucobond Technologies Inc., Benton, Kentucky and is also available from either Commercial Plastics or Curbell. Other suitable materials for constructing the enclosure include the following: acrylonitrile butadiene styrene; LEXAN or NORYL, each manufactured by the General Electric Company, Pittsfield, Mass., and each available from Westlake Plastics Inc., Westlake, Ohio; KYDEX, a high impact, high temperature-resistant acrylic/PVC blend which can be obtained from either Commercial Plastics or Curbell; ELASTOGEN, a particularly flexible PVC which can be obtained from GenCorp Polymer Products Company, Newcomerstown, Ohio; and BOLTARON a high impact, high temperature-resistant, conductive PVC composite which may also be obtained from GenCorp.

Solid PVC flexible hinges can frequently withstand 30 to 40 flexes without impairing the functionality of the hinges, while a foamed PVC hinge can frequently withstand 8 to 10 flexes. Thus, the hinges can be repeatedly folded without fracturing or splitting.

Self-extinguishing polyvinyl chloride and flame retardant polypropylene material can be used for enclosures which are to be installed at locations where fire hazards are present. Polyvinyl chloride is an acceptable material in the National Electrical Code. Such materials may be comprised of homopolymers, copolymers or various blends thereof; they may contain additives including colorants, plasticizers, heat stabilizers, extenders, impact modifiers, fillers, and inhibitors against degradation due to oxidation, ultraviolet light, and the like. Enclosures can be provided in a variety of colors for color coding schemes for circuit identification such as fire alarms, communications, and electrical circuitry for aesthetic purposes. The enclosure, and in particular the faceplate, may be made from transparent or clear polymeric material when it is desired to view the contents of the enclosure without having to open the enclosure. A transparent or clear faceplate and/or enclosure may be particularly desirable when meters, counters, or dials are contained within the enclosure. Transparent polycarbonates or acrylics, such as Lucite, which can be obtained from either Commercial Plastics and Supply Company or from Curbell Industrial Plastics Company, both in Cleveland, Ohio, are suitable materials for use with the invention. Super abrasion-resistant LUCITE, which is resistant to scratching in abrasive environments, is also suitable.

While the rigid plastic enclosures described herein may be suitable for a variety of uses, they are particularly useful for enclosing electrical components and instrumentation. Such applications include use of the enclosure as a pull box, a junction box, a pushbutton control box, an equipment cabinet, or as a splice box. Enclosures can be provided in a variety of sizes, and could include rectangular openings in opposite side walls to form a wireway, or, in adjacent sidewalls to form a wireway fitting. The enclosures may be shipped either flat or preassembled, although it is far preferable to ship them flat. Suppliers and end-users should benefit from the space savings realized when the foldable structures and faceplates are stored flat in stacks.

While the present invention contemplates the manufacture of flat sheets of plastic which are stored or shipped in the flat condition and then folded together to make an enclosure, it also comprehends the manufacture of flat sheets which are folded together into enclosures at the factory. The latter option still has substantial advantages over existing prior art enclosures. To begin with, a single CNC machine can produce a broad product line of enclosures. Other non-metallic enclosure manufacturers require a different mold for each configuration as well as a different mold for each type of plastic material. Molds are expensive and require costly injection molding machinery of varying sizes. The capital outlay for the molded enclosures requires high levels of inventory to justify long production runs. The present invention permits low capital cost and great manufacturing flexibility.

Figure 14:
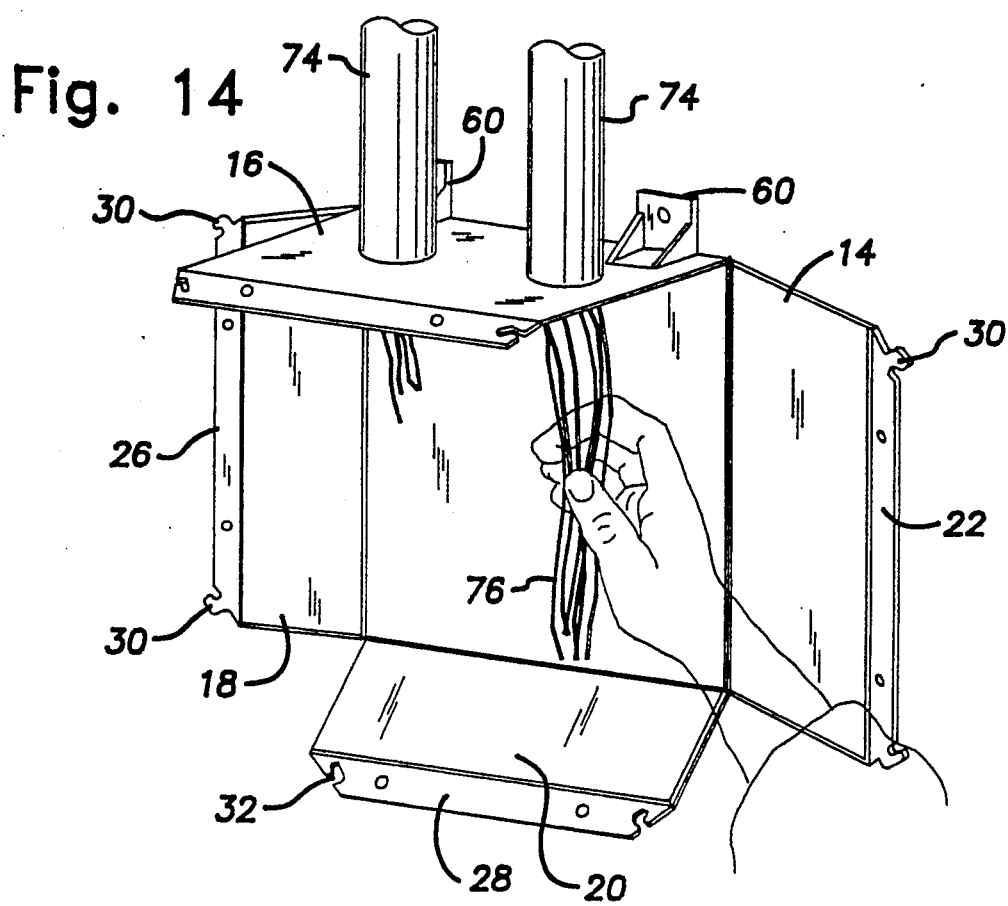
FIG. 14 is a perspective view of a partially folded structure mounted to a wall for use as an electrical junction box.
Figure 15:
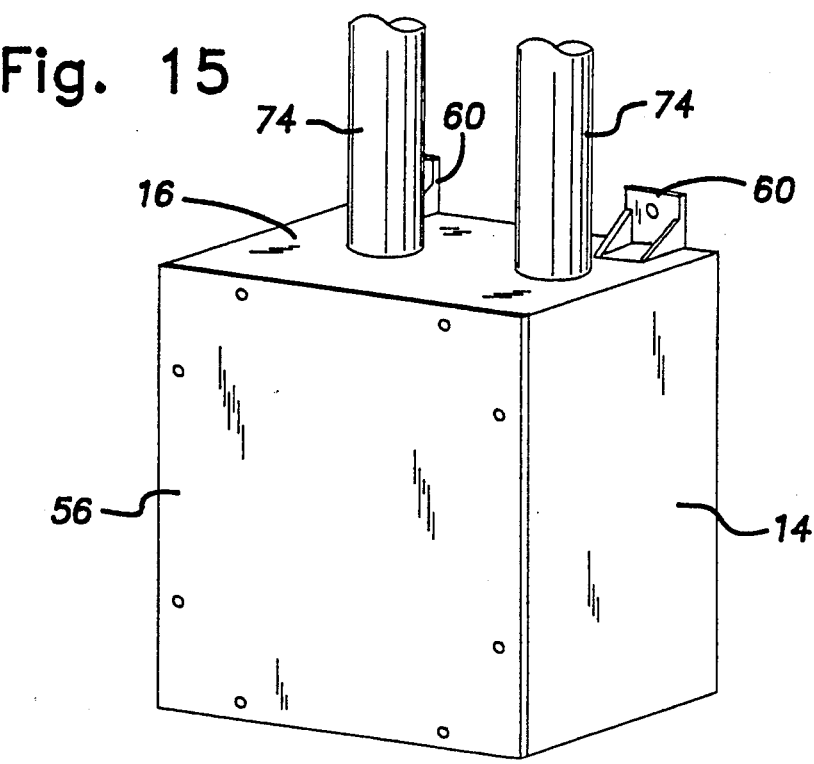
FIG. 15 is a perspective view of the completely folded up structure of FIG. 14 after assembly and attachment of the cover to the flanges.

FIG. 14 illustrates a typical use of the invention as an electrical enclosure, and demonstrates some of the advantages of the invention. The enclosure can be mounted to a wall with screws via screw holes drilled into the backplate of the enclosure or by using mounting brackets 60, as shown in FIGS. 14 and 15. The brackets can be cemented to the top and bottom sidewalls or affixed by commonly known mechanical means such as interlocking slots and knobs or screws. It is preferable, as illustrated in FIG. 14, to affix the enclosure to the wall, with the top sidewall folded down as illustrated, pull wire or cable through the top sidewall, and work with the other three sidewalls open, partially open, or at least non-interlocked. Typically, an electrician would drill one or more holes in the top or other sidewalls and affix conduit 74 thereto, generally utilizing sealing means to make the connection between the conduit and the hole water-resistant or watertight. Thereafter, cable or wire 76 is pulled through the conduit into the interior of the enclosure. The electrician then could mount necessary or desired components in the enclosure. Such components could include meters, instrumentation, counters, fuses, circuit boards, or other electrical or electronic devices or components. The electrician will generally then make any required, necessary or desirable electrical connections or wiring, etc. The electrician can then fold the sidewalls of the plastic sheet to close up the enclosure and lock it into its assembled or closed position.

By bending the sidewalls towards or flat against the wall to which the foldable structure is mounted, an end user, such as an electrician, is free to work in the box unimpeded by the sidewalls. This ability to work unrestricted by the sidewalls should enable the end user to work more quickly and to possibly use a smaller enclosure for a specific application. Similarly, subsequent repairs are more easily made by unfolding the enclosure to move the sidewalls out of the way, performing the repair, and refolding the enclosure.

Fixed sidewalls in conventional enclosures make wire pulling difficult, as the wire must be bent to go over the fixed side opposite the fitting as it enters or exits the termination fitting on the conduit. This is an area where the cable insulation can be stripped as it rides over the edge of the fitting. Many conventional enclosures are oversized to minimize the cable stripping problem. Having the sides open on the new design allows downsizing of the enclosure.

Commonly used steel enclosures are generally provided with knockout holes for running conduit to the enclosure. These knockout holes are used because of the time and difficulty involved in drilling holes into steel on site. The plastic enclosures provided by the present invention do not require knockout holes, since holes can be quickly and easily drilled into the plastic on site. The end user is therefore not confined to preselected knockout holes but, to the contrary, is able to drill holes of any size where they are desired. As shown in FIG. 14, the sidewalls of the enclosure fold to a position so that they are perpendicular to the wall to which the enclosure is mounted, which permits a multitude of enclosures to be mounted, with the sidewall of one enclosure abutting the sidewall of the next. Holes can be drilled through the abutting walls in a single drilling operation to permit communication between adjacent enclosures. This ability to connect enclosures to one another in a side-by-side fashion with abutting sidewalls in parallel relationship facilitates enclosure of large or complicated electrical systems which cannot be housed in a single enclosure. This is called "ganging," and is not possible with injection-molded enclosures.

Computer-numeric-controlled (CNC) cutting machines are sold, for instance, by Motion Master Corporation, of Vista, Calif., and Shinko Trading Co. Ltd., of Japan. Custom designed circular saw blades and routers can be obtained from Herco Inc., Newcomerstown, Ohio.

While it is believed that the folded and mechanically interlocked enclosure described above provides a suitable enclosure for most electrical equipment applications, it is also recognized that an enclosure having heavy duty, watertight seams at the intersecting edges of sidewalls may be desirable in certain situations. The modified enclosure is made by adding two additional steps to the previously described manufacturing methods. First, one beveled edge of the sidewall is routed or otherwise grooved to produce a larger furrow or groove having a semicircular cross section in the face of the sidewall. Second, the semicircular groove is filled with a bead of gasketing material which, upon setting, bonds to the plastic or is mechanically held in place by such means including an undercut or an overhang and has an approximately circular crosssectional shape which provides a permanent, reusable gasket that remains attached to the semicircular grooves. The steplike projection compresses the gasket to form a seal at the corner of the projection when the edges are folded up against one another. Suitable gasketing materials include silicone and neoprene.

Alternatively, sealant may simply be disposed in the furrows 40. While sealants and gaskets may be employed, they are not required. The advantage of the present invention is that the enclosure is raintight without the need for gaskets or sealants. The sealant may be applied with the CNC machine.

To provide additional raintightness or waterresistance, the face of the flanges 22, 24, 26, and 28 and/or the inner side of the faceplate may be provided with grooves. The grooves are made With a specially shaped routing bit which provides a semicircular groove having an inverted V-shaped projection extending from the bottom of the groove. The faceplate may have a semicircular groove filled with a bead of pourable gasket material, such as silicone or neoprene, which forms a circular cross-section and bonds to the groove or engages in an interference fit to form a permanent reusable gasket. When the faceplate is fastened onto the assembled structure 10, the corner or tip of the projection compresses the gasket to form a watertight seal. Another alternative method of sealing the faceplate to the enclosure is to use a preformed spongy neoprene gasket having a pressure-sensitive adhesive protected by a releasable paper. This type of gasket can be shipped with the enclosure, in a separate or attached package, ready for installation by the user.

In accordance with an alternative embodiment of the invention, stainless steel or other suitable metal or plastic hardware can be provided for securing the faceplate to the foldable structure of the plastic enclosure. Commonly known hinges and latches can be used in lieu of screws for fastening the faceplate to the foldable structure, thereby facilitating easy access into the enclosure where repeated access is anticipated. Hinges and latches can be either screwed to the faceplate and sidewalls or, in the case of plastic hardware, cemented, glued, or ultrasonic-welded thereto.

Figure 16:
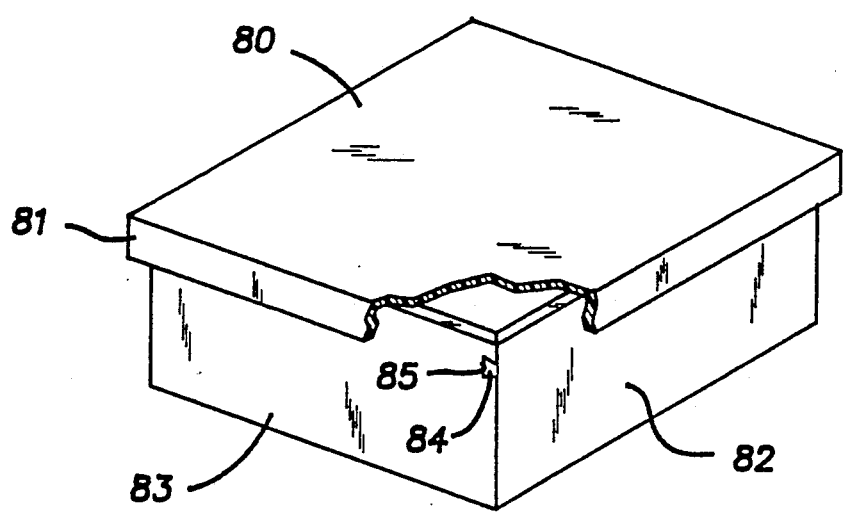
FIG. 16 is a perspective view with portions removed of a structure similar to the structure of FIG. 13, showing that it is interlocked at the corners of the sidewalls, does not have any flanges, and the cover projects down over the interlocking means.

An alternative structure is shown in FIG. 16 in which there are no flanges hinged to the sidewalls and the edges of the sides are held together with an interlocking means comprising a tongue 84 on sidewall 82 and a groove 85 in sidewall 83. The cover 80 has edge portions 81 which project downwardly over the interlocking means. The enclosure of FIG. 16 is not watertight unless solventwelded.

Figure 17:
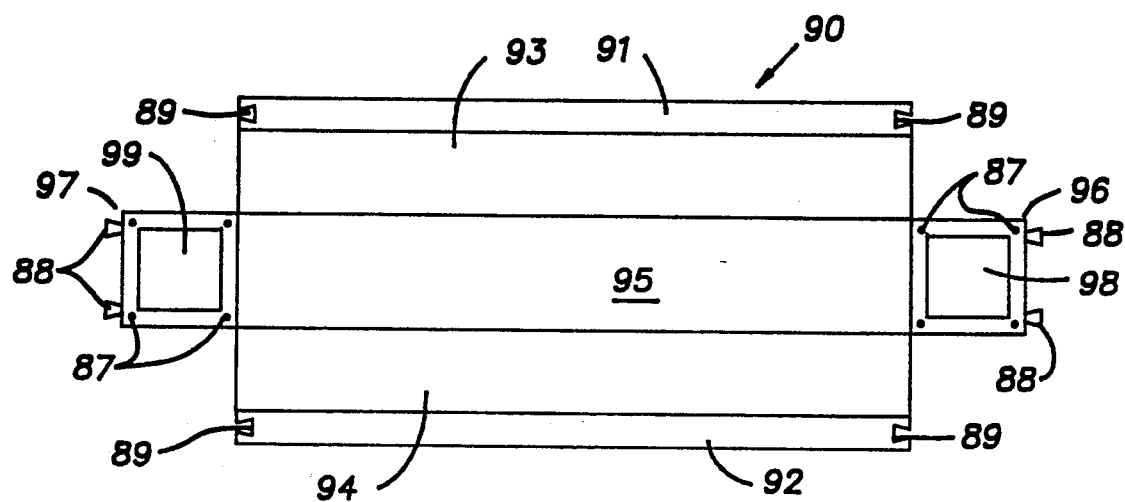
FIG. 17 is a top plan view of a blank for a wireway.
Figure 18:
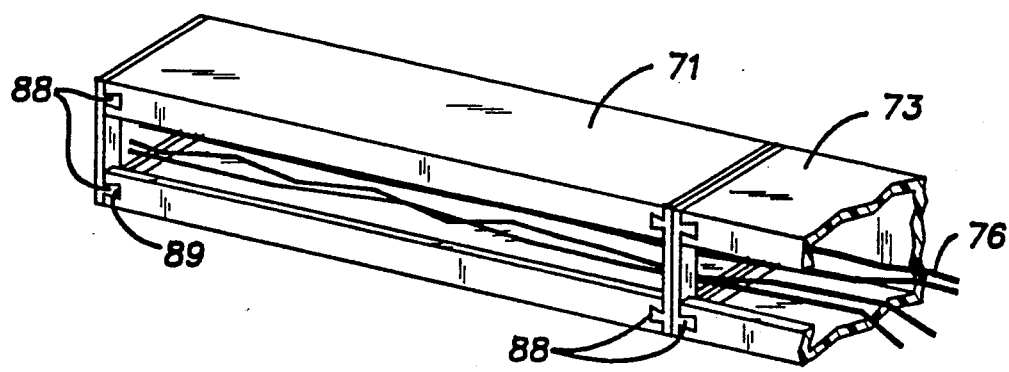
FIG. 18 is a perspective of two wireways of FIG. 17 folded up with the ends bolted together and wires in the wireway.

FIGS. 17 and 18 concern what are called "wireways." These are open, elongated structures into which wires are laid, as shown in FIG. 18. FIG. 17 is a plan view of a wireway blank 90. The blank 90 is long and narrow with sidewalls 93 and 94, flanges 91 and 92, a backplate 95, and narrow side or end walls 96 and 97. The central sections 98 and 99 of the end walls are relieved or open. The means for locking the structure together comprise tongues 88 on the end walls which fit into grooves 89 in the flanges.

FIG. 18 shows two wireways 71 and 73 assembled and bolted together. Holes 87 in blank 90 are the bolt holes. The wireways are otherwise the same as the enclosures previously shown and described herein. An individual wireway may be fabricated with closed ends and is called a "trough."

As used in the specification and claims herein, an open-faced, box-shaped structure means a five or six-sided box with one of the sides or faces being open or partially open, or providing access to the interior of the box, or being openable to provide access to the interior of the box. Typically, the box-shaped structure can be described as a right parallepiped, with each face or side or base (whether open or closed) being or defining a rectangle. Except for wireways, most enclosures are square. It is contemplated, however, that pentagon or hexagon or other less conventionally shaped structures may be made in accordance with my invention.

Figure 4:
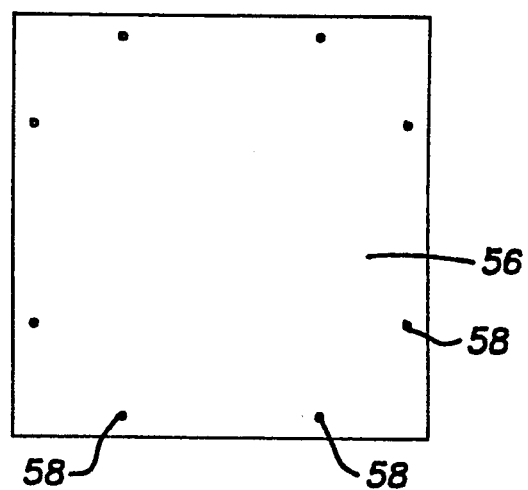
FIG. 4 is a top plan view of the cover for the structure folded up from the blank of FIG. 3.
Figure 19:
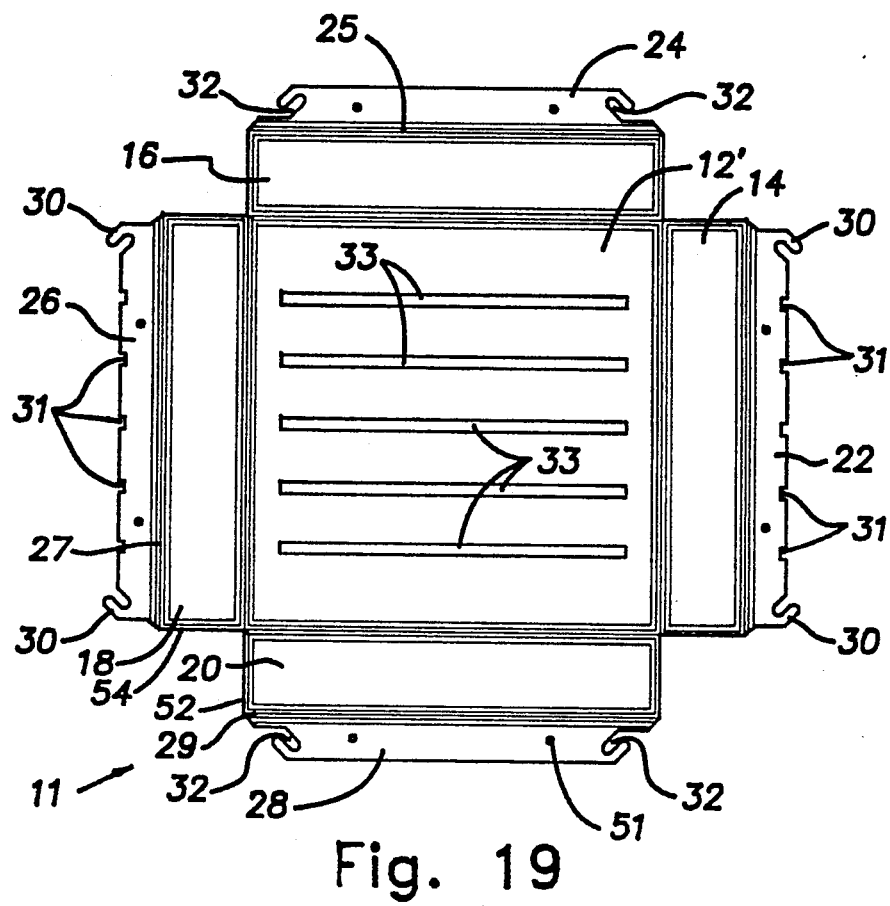
Figure 20:
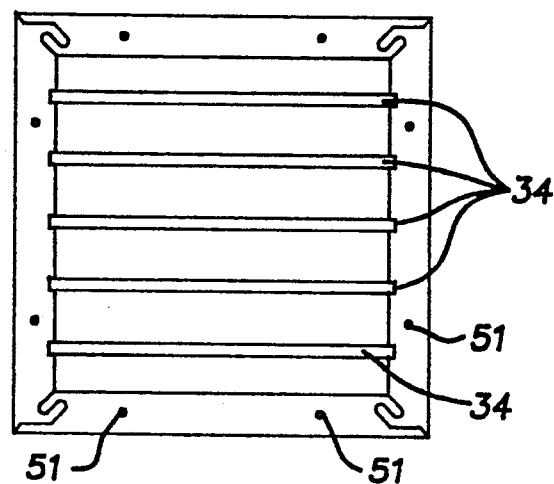
FIG. 20 is a top plan view of the blank of FIG. 19, folded up with printed circuit boards disposed therein.

FIGS. 19 and 20 show how enclosures of the present invention can be used as shipping containers for printed circuit boards. A blank 11 (FIG. 19), which is the same as blank 10 of FIG. 1, is provided with slots 33 cut in the backplate 12' and notches 31 cut into the outside edges of the flanges 22 and 26. The slots 33 are parallel to opposite grooves 17 and 21 of the blank and the notches 31 are cut into the flanges at the ends of the slots so that when the blank is folded up to make a structure, the notches 31 and slots 33 match up and printed circuit boards 34 can be disposed into the structure and suitably supported as shown in FIG. 20. FIG. 20 is a top plan view of the structure folded up from the blank of FIG. 19, with the circuit boards 34 therein. A cover 56 just like the cover of FIG. 4 is placed over the structure to complete the enclosure.

An enclosure with the printed circuit boards in it is shipped to the customer. Upon receipt of the enclosure, the customer opens it up and removes the printed circuit boards. The enclosure is then disassembled and opened to a flat blank like that shown in FIG. 19. The blank and cover are then shipped back to the manufacturer for re-use.

An enclosure such as described above can be used to ship magnetic tapes or discs, printed circuit boards, electronic controls or circuitry, or other goods requiring special noise-free protection or handling. The enclosure can hold the circuit boards or other goods in place during storage, and while they are at a work station or processing point.

The above goods have to be protected from electromagnetic interference (EMI), electrostatic discharge (ESD), and radio frequency interference (RFI). For these applications, static-dissipative and/or electrically conductive additives can be added to the polymer blend to protect the circuitry being enclosed. Suitable static-dissipative additives are carbon black and stainless steel chips. It has been found that adequate static-dissipative characteristics are achieved without adversely affecting the desired properties of the enclosure when the polymer blend contains from about 0.1 to about 1.9% by weight of static-dissipative additives.

Figure 12:
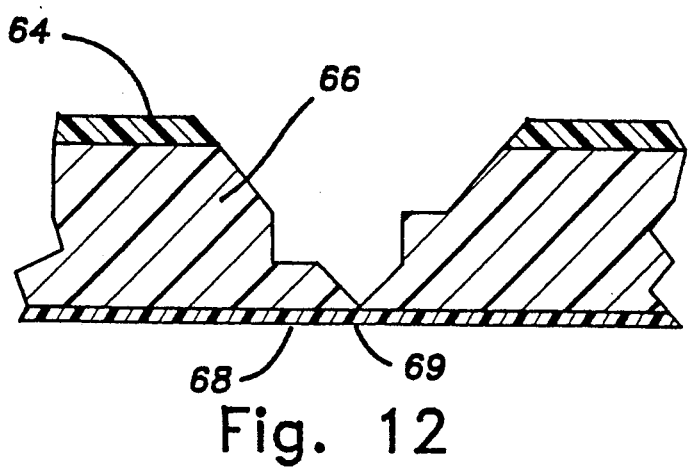
FIG. 12 is an enlarged, fragmentary, cross-sectional view of a foldable plastic blank alternative embodiment having a static-dissipative laminate and a flexible hinge laminate.

Referring to FIG. 12, in accordance with another aspect of the invention, static-dissipative characteristics and shielding for electromagnetic and radio frequency interference are provided by a laminate of static-dissipative material 64 which is applied to either the interior or exterior surfaces of the enclosure components including both the foldable structure and the faceplate. A thin layer of static-dissipative material, such as MITECH, which is available from Mitech Corporation, Twinsburg, Ohio, STATRITE, which is sold by B.F. Goodrich Company, Cleveland, Ohio, or ELECTRAFIL, which is sold by Akzo Engineering Plastics, Inc., Evansville, Ind., is bonded to the surfaces of the enclosure using a lamination glue or polymer solvent such as tetrahydrofuran or methylethyl ketone-based solvents or heat. The exact thickness of the laminate is less important provided that a complete covering of the internal surfaces of the enclosure is achieved; however, because static-dissipative materials are relatively expensive, the thickness of the laminate should be kept to a practical minimum consistent with economical manufacturing techniques. A static-dissipative laminate of a material such as MITECH having a thickness from about 0.015 to about 0.035 inch has been found to be adequate.

FIG. 12 shows a cross-sectional view of a preferred embodiment wherein the plastic sheet is comprised of three separate layers. A central layer 66 is made from a hard, rigid, durable material, preferably foamed or solid polyvinyl chloride, and it has two thin outer layers laminated to it. On the outside face, a thin layer 68 of highly flexible plastic, such as polypropylene, polyethylene, or plasticized polyvinyl chloride, provides a flexible or living hinge 69 which can be bent back and forth between the open and closed positions a multitude of times without splitting, cracking, or substantially deforming. The inside face of the plastic sheet has a static-dissipative layer 64, as previously discussed. The static-dissipative layer 64 joins at right angles when the blank is folded together into an enclosure.

While the invention has been shown and described with respect to a particular embodiment thereof, this is for the purpose of illustration rather than limitation, and other variations and modifications of the specific embodiment herein shown and described will be apparent to those skilled in the art all within the intended spirit and scope of the invention. Accordingly, the patent is not to be limited in scope and effect to the specific embodiment herein shown and described nor in any other way that is inconsistent with the extent to which the progress in the art has been advanced by the invention.

What is claimed is:

1. A flat rigid or semi-rigid plastic blank comprising:
a backplate;
grooves with an included angle between first and second groove walls of substantially 90 degrees cut into one surface of the blank to define four rectangular sidewalls, an edge of each sidewall being attached to an edge of the backplate by an integral hinge portion in the other surface of the blank below the groove;
the cross section of each groove defining at least one ridge in a first groove wall which interfits with a furrow in a second groove wall, the grooves parallel to each other being identical in cross-section and the grooves at right angles to each other being reversed but otherwise identical in cross-section to the parallel grooves,
the sidewalls being foldable along the hinge portions to form a rigid, open-faced structure when provided with means for holding the edges of adjacent sidewalls together.

2. A water-resistant enclosure made by folding the blank of claim 1 into an open-faced structure, providing means for holding the edges of adjacent sidewalls together, and attaching a cover.

3. A blank in accordance with claim 1 in which there are an additional set of grooves along the edges of the sidewalls to define flanges with mechanical interlocking means formed in the flanges.

4. A blank in accordance with claim 3 in which the interlocking means comprises footlike projections on the flanges which interfit with footlike slots in the flanges at the corners thereof.

5. A water-resistant enclosure made by folding the blank of claim 4 into an open faced structure, interfitting the interlocking means and attaching a cover.

6. A blank in accordance with claim 1 in which there is one ridge and one furrow in the groove walls and the ridges make an included angle of 90° with the groove walls and the furrows make an included angle of 90° with the groove walls.

7. A water-resistant enclosure made by folding the blank of claim 1 into an open faced structure, welding together the inside edges of the sidewalls, and attaching a cover.

8. A blank in accordance with claim 1 made up from a plastic sheet which is laminated with the bottom portion of the laminate being made of a layer of plastic material that can withstand many flexings so that the hinge portions below the grooves can withstand many flexings.

9. A blank in accordance with claim 1 made up from a plastic sheet which is laminated with the top portion of the laminate being made of a layer of an electrostatically dissipative material.

10. A blank in accordance with claim 1 made up from a plastic sheet which is laminated, with the bottom portion of the laminate being made of a layer of a plastic material which can withstand many flexings and the top portion of the laminate being made of a layer of static-dissipative plastic material.

11. An enclosure made by folding the blank of claim 10 into an open-faced, box-shaped structure and attaching a cover which has a layer of static-dissipative material on the inside surface thereof.

12. A blank in accordance with claim 1 made up from a plastic sheet which contains static-dissipative material.

13. A blank in accordance with claim 1 which is made from an organic polymer plastic selected from the group comprising polyvinyl chloride, polyethylene, polypropylene and polycarbonate.

* * * * *